US007907542B2

(12) United States Patent
Smith

(10) Patent No.: US 7,907,542 B2
(45) Date of Patent: Mar. 15, 2011

(54) APPARATUS, SYSTEM, AND METHOD FOR GENERATING AND AUTHENTICATING A COMPUTER PASSWORD

(75) Inventor: Steven W. Smith, Dallas, TX (US)

(73) Assignee: 5th Fleet, L.L.C., Richardson, TX (US)

( * ) Notice: Subject to any disclaimer, the term of this patent is extended or adjusted under 35 U.S.C. 154(b) by 282 days.

(21) Appl. No.: 12/286,503

(22) Filed: Sep. 30, 2008

(65) Prior Publication Data

US 2009/0037992 A1 Feb. 5, 2009

Related U.S. Application Data

(63) Continuation-in-part of application No. 11/020,780, filed on Dec. 22, 2004, now Pat. No. 7,430,756.

(51) Int. Cl.
*H04J 1/16* (2006.01)
*H04L 12/56* (2006.01)

(52) U.S. Cl. ......... 370/252; 370/278; 370/282; 370/386

(58) Field of Classification Search .................. 370/252, 370/278, 282, 386
See application file for complete search history.

(56) References Cited

U.S. PATENT DOCUMENTS 7,836,166 B2 * 11/2010 Kuan et al. .................... 709/224
2006/0075230 A1 * 4/2006 Baird et al. .................. 713/168
2008/0301791 A1 * 12/2008 Smith et al. ....................... 726/7

* cited by examiner

*Primary Examiner* — John Pezzlo
(74) *Attorney, Agent, or Firm* — Steven W. Simth

(57) ABSTRACT

An apparatus, system, and method for constructing, transmitting, and authenticating a password utilized by an authentication device to authenticate an access device. The authentication device receives the password from the access device, authenticates the access device if the password matches stored information, and returns an acknowledgment message that includes an index value associated with a stored character set. The access device constructs and transmits the password. The access device receives from a user, a plurality of predefined characters forming a User ID. The access device also receives the acknowledgment message and index value from the authentication device. The index value is used to identify a set of password modification factors from a plurality of sets stored in a lookup table. The access device utilizes the identified set to modify a password, and transmits the password to the authentication device.

4 Claims, 9 Drawing Sheets

APPARATUS, SYSTEM, AND METHOD FOR GENERATING AND AUTHENTICATING A COMPUTER PASSWORD

RELATED APPLICATIONS

This application is a continuation-in-part of U.S. patent application Ser. No. 11/020,780 filed Dec. 22, 2004 now U.S. Pat. No. 7,430,756 in the name of Steven W. Smith, the disclosure of which is incorporated herein by reference in its entirety.

BACKGROUND

1. Technical Field

The present invention is directed, in general, to computer security systems. More particularly, and not by way of limitation, the present invention is directed to an apparatus, system, and method for generating and authenticating a password to protect a computer system from unauthorized access.

2. Description of Related Art

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "snoops." The popular definition of a snoop refers to individuals who intercept messages sent from one computer system to another for the purpose of stealing data or learning passwords that can then be used to gain unauthorized access to networks or confidential information.

A snoop may gain access to an Internet router or access point where the snoop can read data as it is routed from one location to another. Encryption of the data may prevent the snoop from making use of the intercepted data. However, for various reasons, much of the data sent over the Internet is not encrypted. For example, most household computer users do not encrypt data such as passwords when they access online services. Such users may access bank accounts, online brokerage accounts, credit card accounts, and other such accounts containing highly sensitive data. If a snoop intercepts an unencrypted access message intended for a target account, and the message includes the user's password and user ID, the snoop can then access the target account and perform any actions that the user himself may be authorized to perform.

In one existing solution, the user creates a two-factor password whenever the user logs on. The first factor is the user's personal identification number (PIN), which the user enters as the first part of the password. The user obtains the second factor from an electronic token, which displays a 6-digit number. The token is time-synchronized with the authentication server, and the number displayed on the token changes every minute. The user enters the 6-digit number displayed on the token as the second part of the password. Any hacker who has learned the user's PIN cannot gain access because the hacker does not know the second factor, i.e., the 6-digit number from the token.

This two-factor password works well, but has several disadvantages. First, if a user does not have his token with him, he cannot log in. Second, if the token breaks or the battery fails, the user cannot log in. Third, even if everything works as advertised, the user has the burden of having to look at the token and enter a different 6-digit number, in addition to the user's PIN, every time he logs on. If a company has a network that kicks the user off every 5-10 minutes if he doesn't continually use the computer, entering the extra token number every time he logs back on becomes a serious burden.

SUMMARY

Therefore, a need exists in the art for an improved system and method for generating and authenticating a password to protect a computer system from unauthorized access. In particular, there is a need for an apparatus, system, and method that is simple to implement, capable of providing an online computer system with protection against snoops, and does not place any additional burden on the user. The present invention provides such an apparatus, system, and method.

In one aspect, the present invention is directed to an apparatus in an access device for constructing and transmitting a password utilized by an authentication device to authenticate the access device. The apparatus includes means for receiving from a user, a plurality of predefined characters forming a User ID; a lookup table for storing a plurality of character sets, each character set including a plurality of predefined characters, wherein each character set is associated with a predefined index value; and communication means for receiving an index value from the authentication device. The apparatus also includes means for generating a password utilizing a character set associated with the index value received from the authentication device; and means for transmitting the password to the authentication device.

In another aspect, the present invention is directed to a method of constructing and transmitting a password utilized by an authentication device to authenticate the access device. The method includes receiving from a user, a plurality of predefined characters forming a User ID; receiving an index value from the authentication device; and identifying a character set associated with the index value in a lookup table in which a plurality of character sets are stored. Each character set includes a plurality of predefined characters, and each character set is associated with a predefined index value. The method also includes generating a password utilizing the identified character set associated with the index value received from the authentication device; and transmitting the password to the authentication device.

In another aspect, the present invention is directed to a system for constructing, transmitting, and authenticating a password utilized by an authentication device to authenticate an access device. The system includes an authentication device for authenticating the password. The authentication device includes communication means for receiving the password from the access device and returning an acknowledgment message to the access device; means for positively authenticating the access device if the password matches stored information associated with the access device; and means for selecting an index value and including the selected index value in the acknowledgment message returned to the access device, said index value being associated with a stored character set. The system also includes an access device for constructing and transmitting the password. The access device includes means for receiving from a user, a plurality of predefined characters forming a User ID; and a lookup table for storing a plurality of character sets. Each character set includes a plurality of predefined characters, and each character set is associated with a predefined index value. The access device also includes communication means for receiving the acknowledgment message including the index value from the authentication device; means for generating a password utilizing a character set associated with the index value received from the authentication device; and means for transmitting the password to the authentication device.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an improved system and method for generating and authenticating a password to protect the password from snoops and to prevent unauthorized access to secure information. In the description herein, the invention is described in terms of a user accessing an authentication server over a public data network such as the Internet. It should be understood that the description herein is exemplary only, and the invention is applicable to all types of password-protected computer systems.

Figure 1:
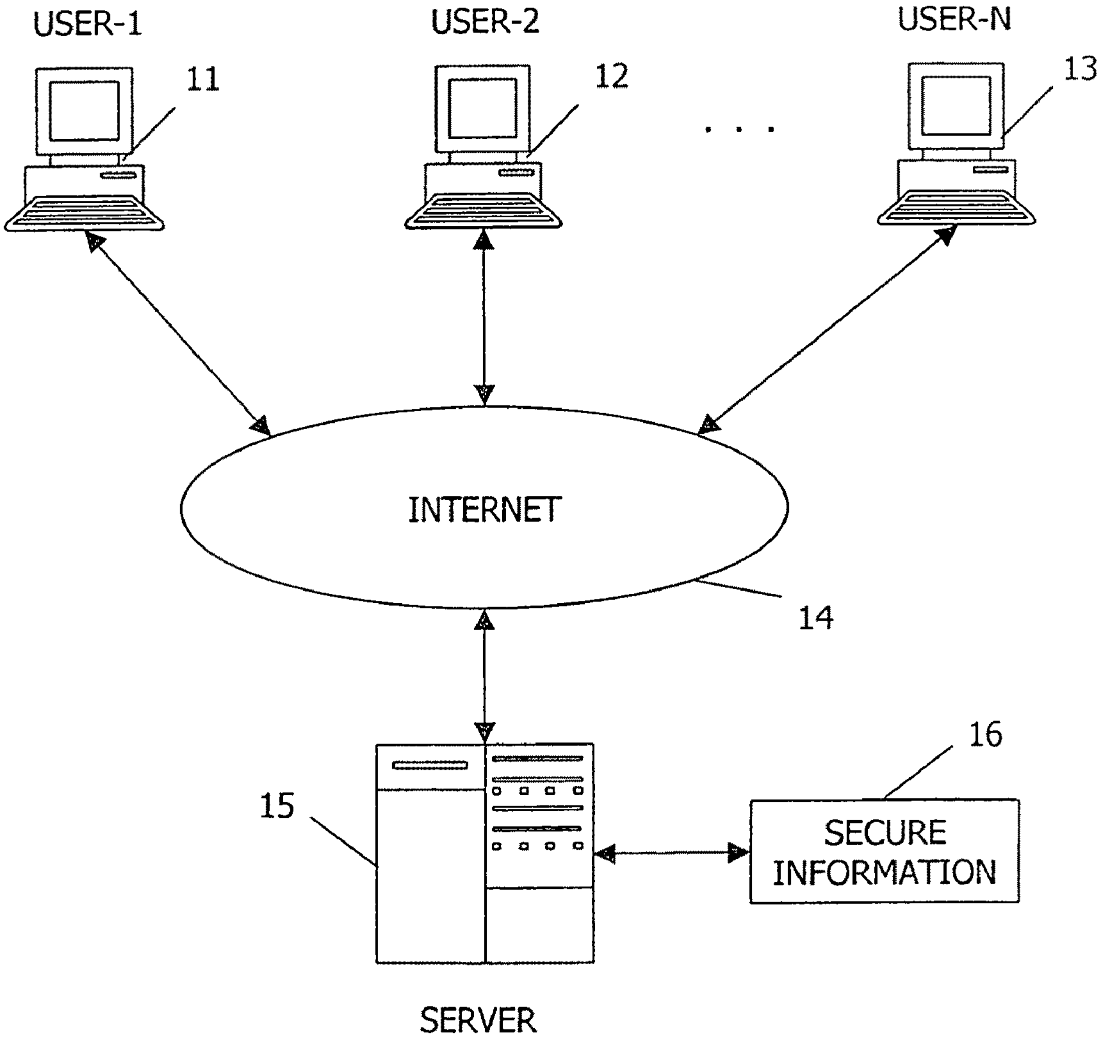
FIG. 1 is a simplified functional block diagram of an Internet connection suitable for implementing the present invention.

FIG. 1 is a simplified functional block diagram of an Internet connection suitable for implementing the present invention. A plurality of user terminals such as User-1 11, User-2 12, and User-N 13 communicate through a data network such as the Internet 14 with an authentication server 15. The user terminals may be PCs, workstations, or any other type of computer access device capable of forming and sending a password. The data network may also be, for example, an Internet Protocol (IP)-based local area network (LAN), wide area network (WAN), wireless LAN (WLAN), or any other suitable means for connecting each of the user terminals to the server. The authentication server may provide access to secure information after properly verifying an accessing user's password.

Figure 2:
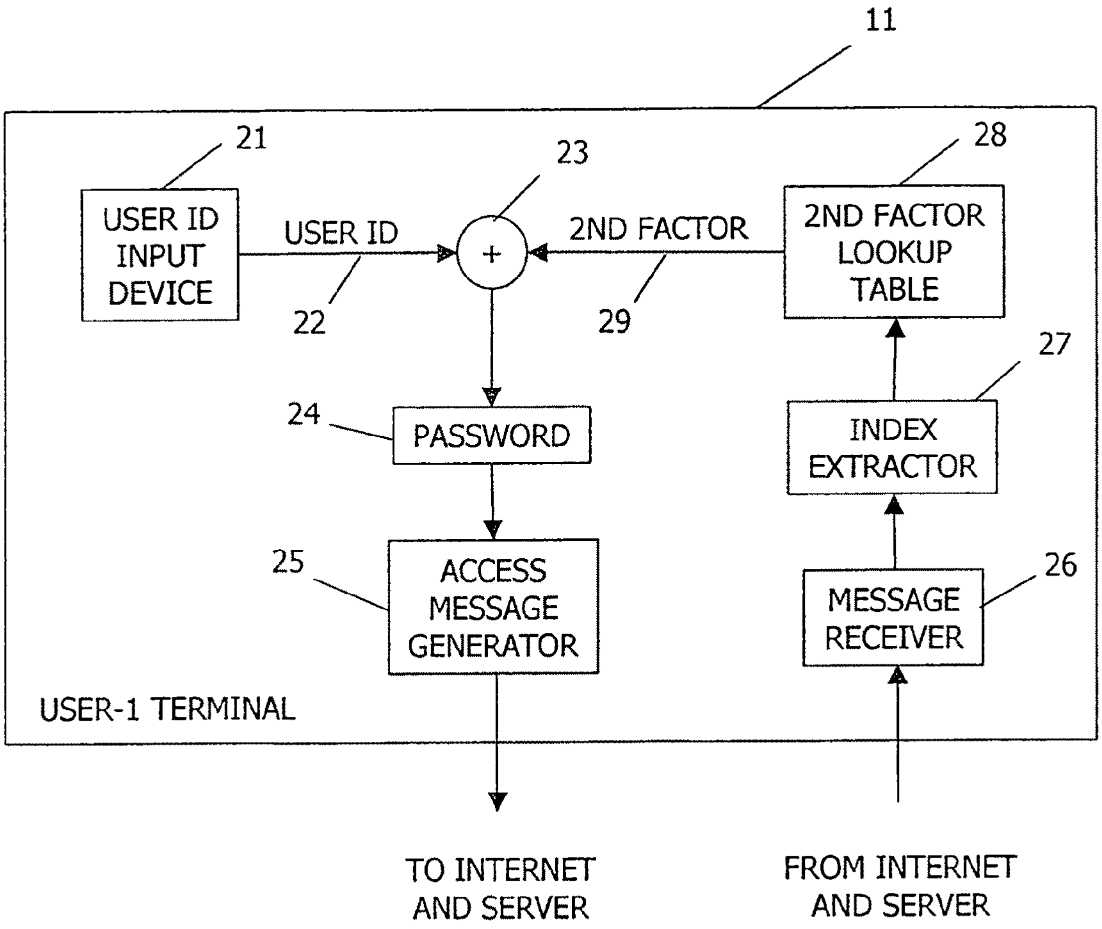
FIG. 2 is a simplified functional block diagram of a user terminal modified in accordance with the present invention.

FIG. 2 is a simplified functional block diagram of a user terminal such as User-1 terminal 11 modified in accordance with the present invention. The terminal includes a User ID input device such as a keyboard or keypad for inputting a User ID 22 unique to the user. The User ID is passed to a password generator 23. The first time the user attempts to access the server 15, the password generator may use the User ID by itself as the password 24. Alternatively, if the user is opening a new account, the account operator may provide the user with additional identifying information to enter the first time along with the User ID. In this case, the password generator 23 integrates the User ID 22 and the additional information to form the password 24. An access message generator 25 then incorporates the password into an access message that is sent over the Internet 14 to the server.

After the server 15 authenticates the password, the server returns an acknowledgment (ACK) message to a message receiver 26 in the User-1 terminal 11. The ACK message includes an index value. An index extractor 27 extracts the index value and uses it to access a second factor lookup table 28 and identify a second factor 29. In a subsequent access attempt by User-1, the password generator 23 integrates the User ID 22 and the second factor 29 to form the integrated password 24. After each successful access, the server sends a new index value to the User-1 terminal. Consequently, a different second factor is integrated with the User ID each time User-1 accesses the server. Thus, even though the user always enters the same User ID, a different and unique password is transmitted to the server for each access.

In an alternative embodiment, the User-1 terminal 11 includes an authentication unit, which verifies that the user enters a valid User ID or combination of User ID and password. Once the entered data has been positively verified, the password generator 23 generates a new password by replacing some or all of the entered data with a second factor drawn from the lookup table 28. As in the previous embodiment, after each successful access, the server sends a new index value to the User-1 terminal. Consequently, a different second factor is drawn from the lookup table and utilized as the password each time the user accesses the server. Thus, a different password, totally unrelated to the user's entered information, is transmitted over the network for each access.

In one embodiment, each user has a different second factor lookup table 28. In addition, the server may periodically push a new lookup table to each user, thus replacing each user's lookup table with a new lookup table. Lookup tables may be replaced as often as the network operator desires.

Figure 3A:
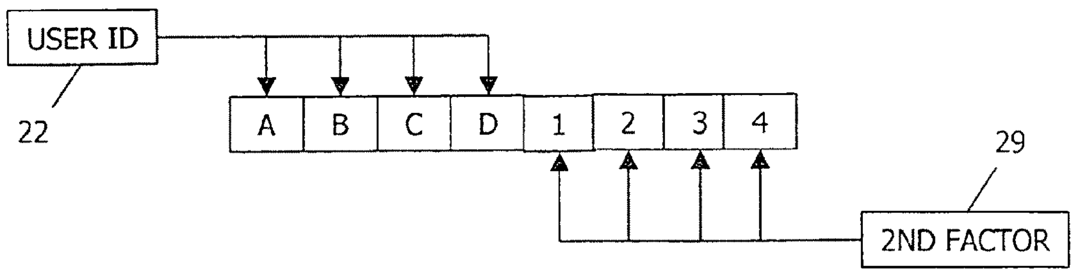
FIGS. 3A-3F are illustrative drawings of exemplary methods of integrating a User ID and second factor to form an integrated password data structure.
Figure 3B:
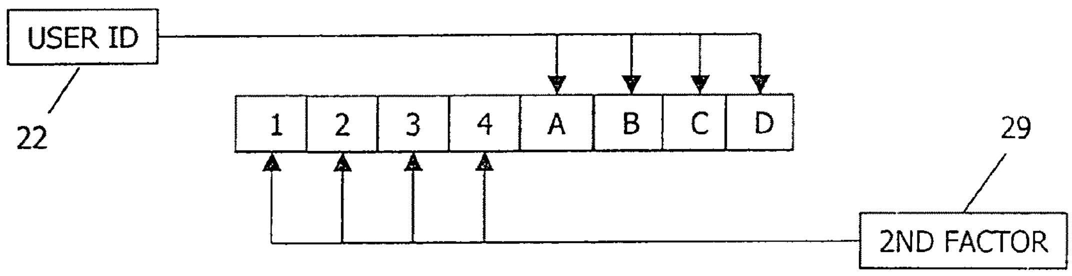
Figure 3C:
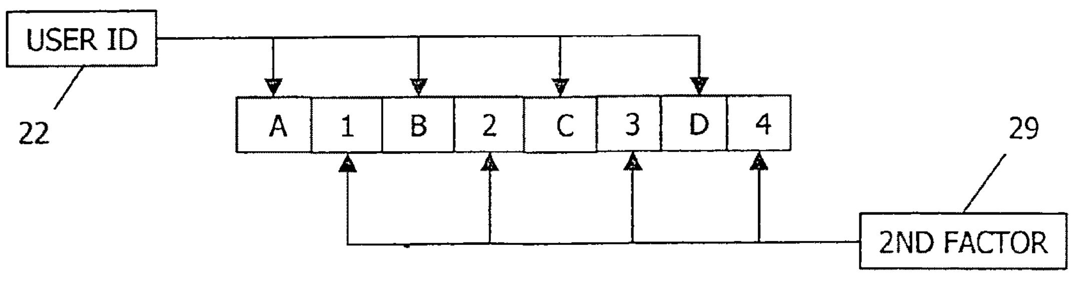
Figure 3D:
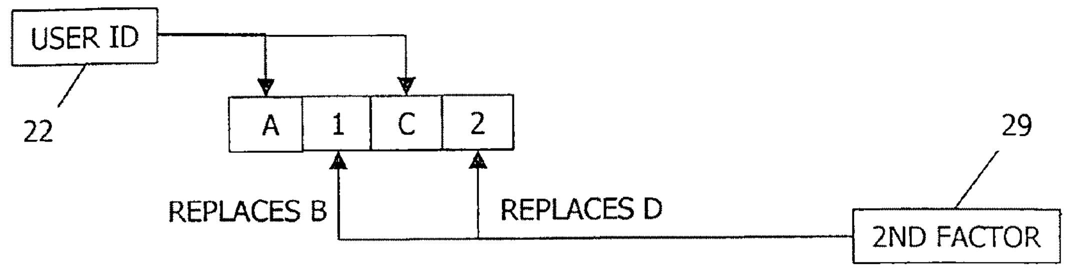
Figure 3E:
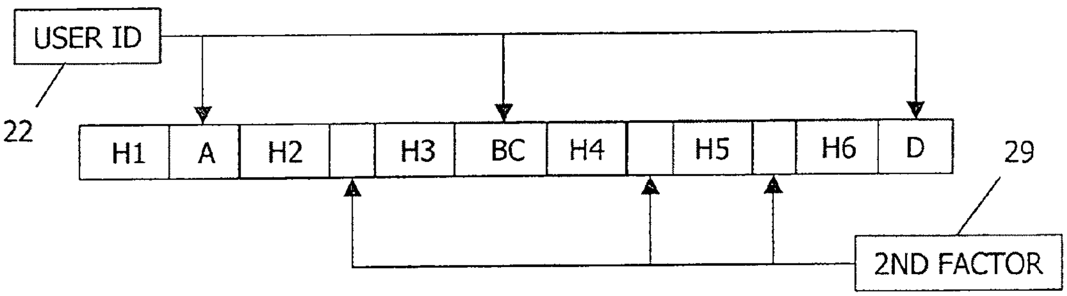
Figure 3F:
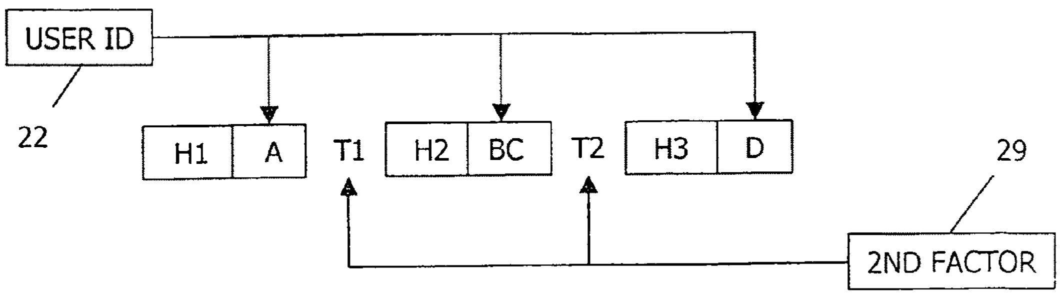

FIGS. 3A-3C are illustrative drawings of exemplary methods of integrating a User ID and second factor to form an integrated password data structure. In each figure, an exemplary User ID of ABCD and an exemplary second factor of 1234 are shown for illustrative purposes only. In practice, the User ID, second factor, or both may include a greater number of characters, and each may include a mixture of letters, numbers, and other characters.

Referring first to FIG. 3A, an example is shown in which the password generator 23 integrates the User ID 22 and the second factor 29 by adding the second factor onto the end of the User ID.

Referring next to FIG. 3B, an example is shown in which the password generator 23 integrates the User ID 22 and the second factor 29 by adding the second factor to the front of the User ID.

Referring next to FIG. 3C, an example is shown in which the password generator 23 integrates the User ID 22 and the second factor 29 by interleaving one or more characters of the second factor between the characters of the User ID. Any number of characters of the second factor may be placed between any two characters of the User ID, while no second-factor characters are placed between other characters of the User ID. This creates a large number of potential combinations for forming the integrated password. As long as the server 15 knows the integration scheme, the server can still properly verify the password.

Although not specifically illustrated, the password generator 23 may also replace some or all of the characters of the User ID 22 with the second factor 29. Preferably, this is done after the user terminal verifies that the entered User ID is a valid User ID. Alternatively, the characters of the User ID may be transmitted in separate packets, and information from the second factor may be added to some or all of the User ID character packets.

Figure 4:
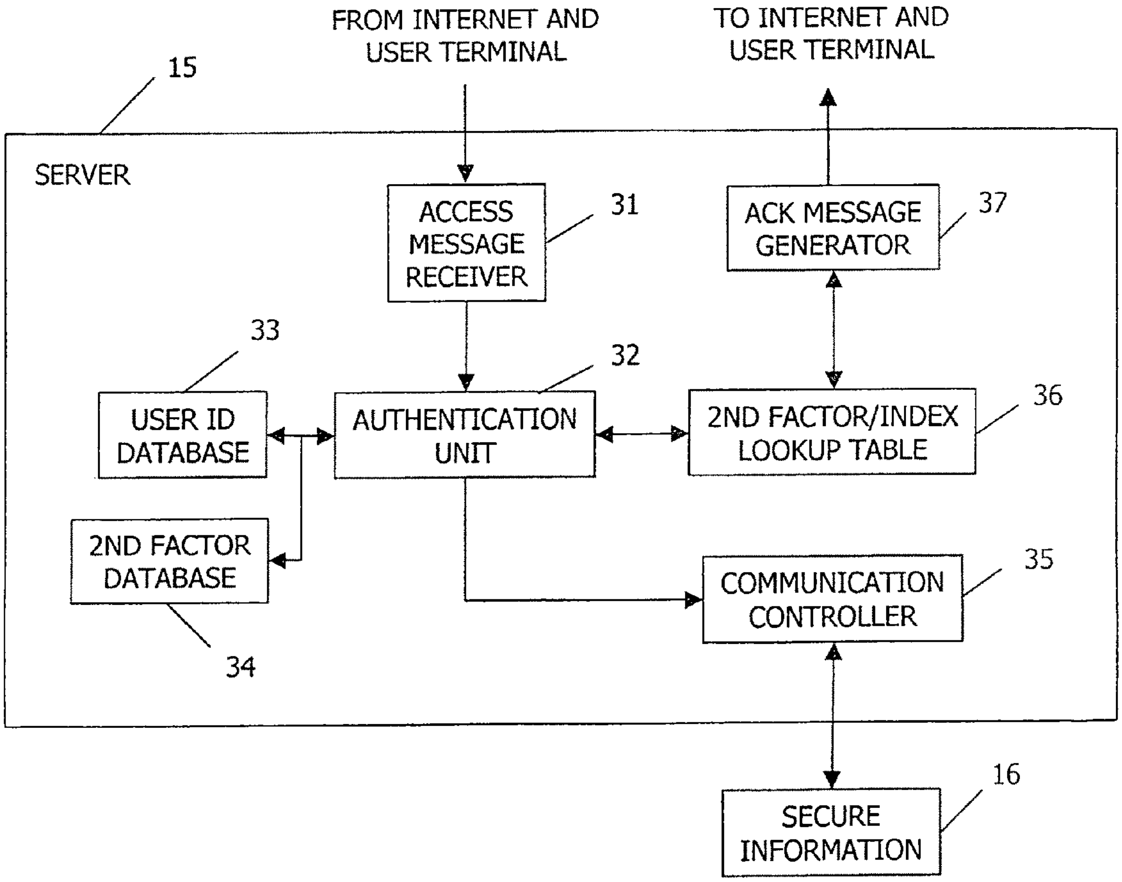
FIG. 4 is a simplified functional block diagram of an exemplary authentication server modified in accordance with the present invention.

FIG. 4 is a simplified functional block diagram of an exemplary authentication server 15 modified in accordance with the present invention. An access message receiver 31 receives an access request from the Internet 14 and the User-1 terminal 11. The password included in the access request is sent to an authentication unit 32. The authentication unit verifies the password by first accessing a User ID database 33 and comparing the User ID portion of the password to a User ID stored in the User ID database. The authentication unit also accesses a second factor database 34 and compares the second factor portion of the password to a second factor stored in the second factor database. This verification may include not only a verification of the characters, but also the placement of the characters in relation to the characters of the User ID in the password. The authentication unit positively verifies the password only if both the User ID and the second factor match. If both match, the authentication unit authorizes a communication controller 35 to provide the user with access to the secure information 16.

Following either a positive or negative verification, the server 15 returns an acknowledgment (ACK) or a negative acknowledgment (NACK) to the User-1 terminal 11. In both the ACK and the NACK, the server includes a new index value for the second factor lookup table 28 in the User-1 terminal. If for some reason the User-1 terminal used the wrong second factor, the inclusion of a new index value in the NACK should resynchronize the User-1 terminal and the server.

In one embodiment, the server 15 retrieves the new index value from a second factor/index lookup table 36. Once an index value and second factor are selected, the second factor is sent to the second factor database 34, and the index value is sent to an ACK (or NACK) message generator 37. The ACK/NACK message is then sent to the User-1 terminal together with the new index value.

In an alternative embodiment, the access message received from the User-1 terminal 11 includes the index value in addition to the password. The authentication unit 32 compares the User ID portion of the password to a User ID stored in the User ID database 33. The authentication unit 32 then accesses the second factor/index lookup table 36 using the index value received in the access message. The authentication unit then compares the received second factor with the second factor associated with the index value in the second factor/index lookup table 36. Thus in this embodiment, the separate second factor database 34 is not required.

Figure 5:
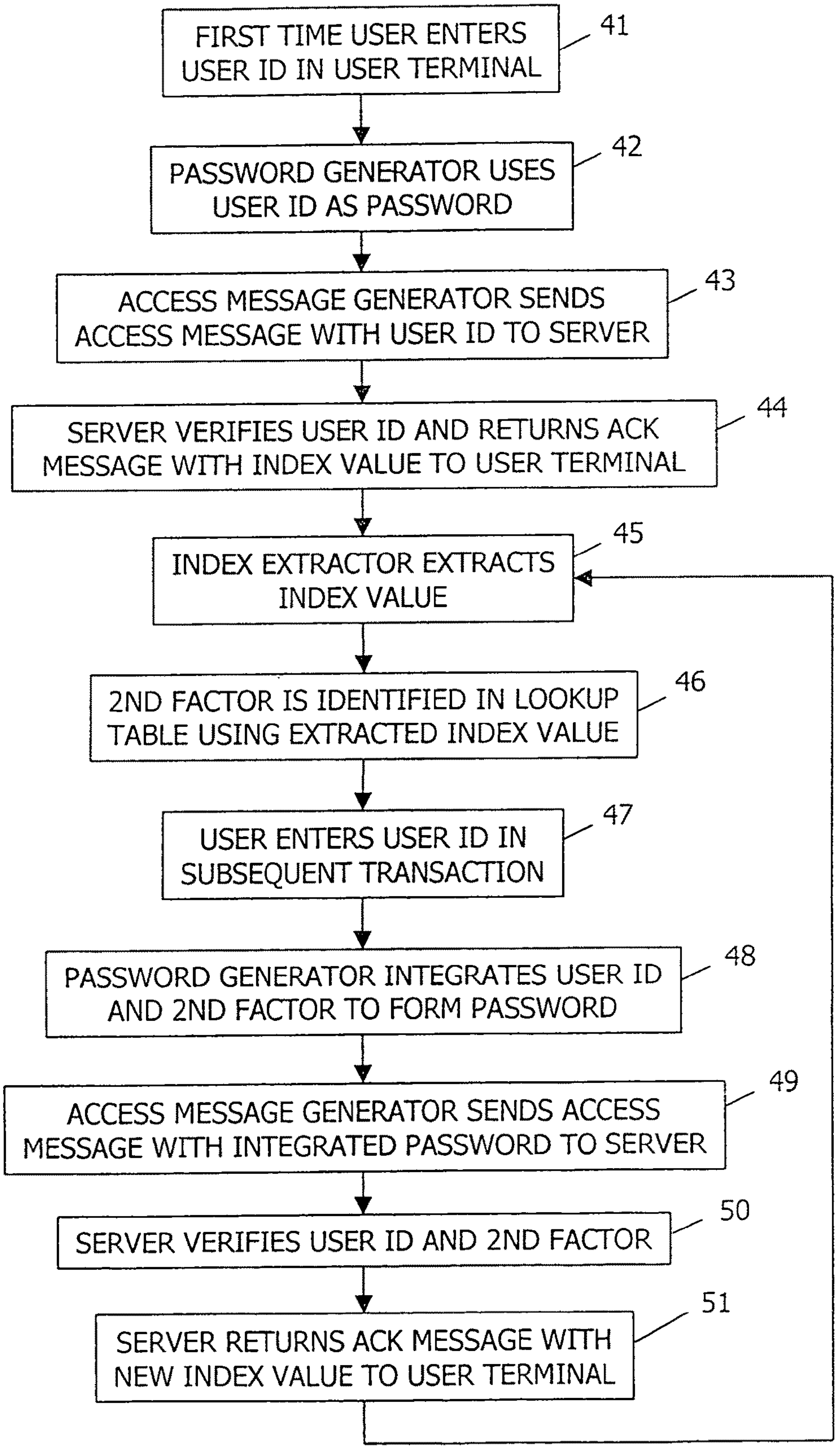
FIG. 5 is a flow chart illustrating the steps of an exemplary embodiment of a method of generating and authenticating a password according to the teachings of the present invention.

FIG. 5 is a flow chart illustrating the steps of an exemplary embodiment of a method of generating and authenticating a password according to the teachings of the present invention. At step 41, at step 41, a first-time user enters a User ID in a user terminal such as User-1 terminal 11. At step 42, the password generator 23 uses the User ID as the password for this first access attempt. At step 43, the access message generator 25 sends an access message with the User ID to the server 15. At step 44, the server verifies the User ID, provides the first-time user with access, and returns an ACK message with an index value to the User-1 terminal.

At step 45, the index extractor 27 in the User-1 terminal 11 extracts the index value from the received ACK message. At step 46, the User-1 terminal identifies a second factor associated with the index value in the lookup table 28. The identified second factor is to be utilized by the User-1 terminal in the next access attempt. Therefore, when the user enters the User ID in a subsequent transaction at step 47, the password generator 23 integrates the User ID and the second factor at step 48 to form a new password. At step 49, the access message generator 25 sends an access message with the integrated password to the server 15. At step 50, the server verifies the User ID and the second factor, and provides the user with access. At step 51, the server and returns an ACK message with a new index value to the User-1 terminal. The process then returns to step 45 and repeats the process by identifying a new second factor to be utilized by the User-1 terminal in the next access attempt. Thus, although the user continues to enter the exact same User ID for each access attempt, a different password is generated and transmitted to the server for each access attempt.

A benefit of the present invention is that it is transparent to the user. That is, the user always enters the same password or User ID for every transaction. The terminal adds a new second factor for each transaction, thus creating a new password for each transaction. The user does not have to remember multiple passwords, does not have to change his password on a periodic basis, or does not have to enter additional numbers from an electronic token. Even if a snoop learns the user's password, the snoop cannot use the password in a subsequent transaction to gain access because the second factor will no longer be valid.

In a preferred embodiment of the present invention, the second factor is identified and integrated with the User ID in a client program resident on the user terminal. This program, along with the second factor lookup table 28 may be downloaded from the server, loaded from a transportable medium, or may be resident on a memory device interfaced with the user terminal. For example, the client program may be resident on a USB flash memory that is simply plugged into the USB port on the user terminal. In this manner, the user can move to a different terminal or access the server from a laptop computer while traveling simply by moving the USB flash memory to a different computer.

When accessing the server over the Internet through an Internet browser, the user may first access a web page where the user is requested to enter a User ID and a password or pin. In one embodiment, when the user enters his normal password, the browser sends the password to the client program, which integrates the password with the second factor. The client program returns the integrated password to the browser, which then transmits the integrated password over the Internet to the server. A browser plug-in such as an ActiveX plug-in may intercept the outgoing user password and modify the password with the second factor drawn from the lookup table. In another embodiment, a Java applet or other type of Browser Helper Object (BHO) may recognize from the keystrokes on the keyboard that the user is typing a password. The user password is then intercepted by the BHO before it goes to the browser. The second factor is added to the password, and the two-factor password is then sent to the browser, which transmits the two-factor password to the server.

Figure 6:
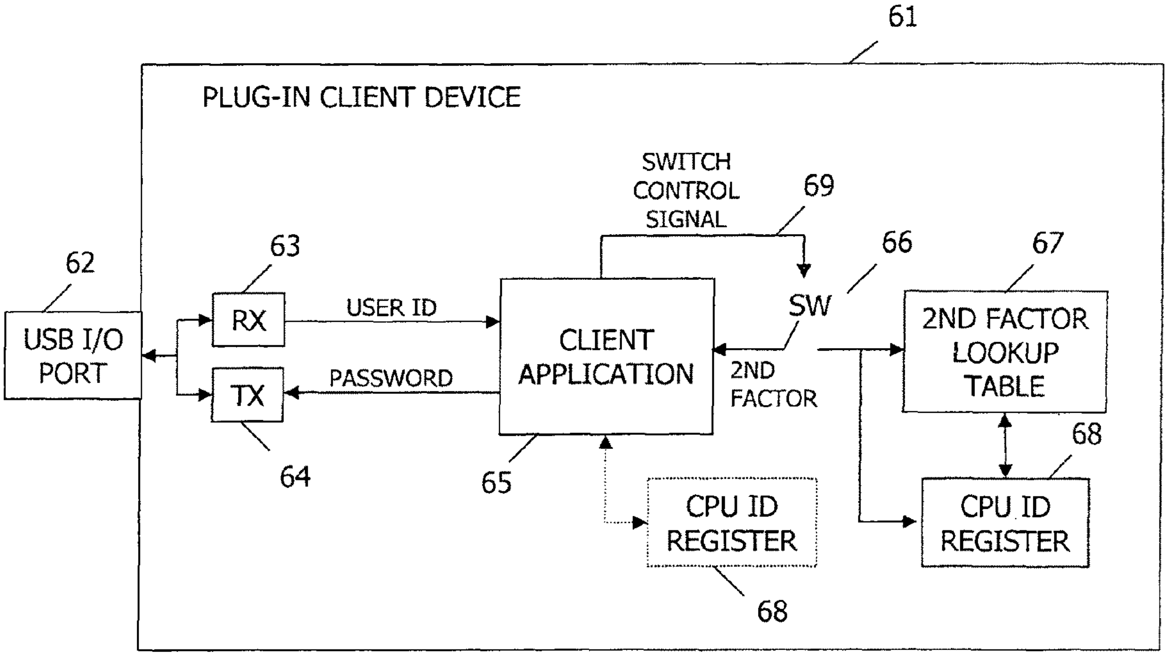
FIG. 6 is a high level functional block diagram of a plug-in client device in accordance with one embodiment of the present invention.

FIG. 6 is a high level functional block diagram of a plug-in client device 61 in accordance with one embodiment of the present invention. In the exemplary embodiment illustrated, the client device plugs into a user's computer or PC using a Universal Serial Bus (USB) input/output (I/O) port 62. Of course, the device may alternatively connect to the PC through other types of I/O ports, either wired or wireless. The USB port provides a receiving function 63 and a transmitting function 64 providing communications with a client application 65 loaded on the device. A mechanical switch 66 physically connects or disconnects the client application from a second-factor lookup table 67 and a CPU ID register 68. A switch control signal 69, generated by the client application, may control the opening and closing of the mechanical switch in particular embodiments.

The plug-in client device may be utilized to provide a PC with secure password communication with the server 15. The mechanical switch 66 is normally in the open position so that there is no access to the second-factor lookup table 67 or the CPU ID register 68. In one embodiment, when the user connects the device to the PC's USB port, the user physically moves the mechanical switch to the closed position. At that point, firmware provides the client application 65 with a single access to the lookup table and the CPU ID register. The client application then performs a mutual authentication procedure with the host PC. The ID of the host PC's CPU and a Device ID from the client device are exchanged and recognized as being authorized for mutual operation. The host PC generates a connection context, which is downloaded to the client device via a cable connection or, in the case of a wireless connection, by means of an ultra wideband (UWB) radio like with PK technology or by means of near field communications.

The first time the plug-in client device is used with the host PC, the CPU ID is stored in the CPU ID register 68. Thereafter, each time the plug-in client device is connected to a host, the client application retrieves the CPU ID from the host and compares the retrieved CPU ID with the stored CPU ID. The plug-in client device will operate only with a PC having a CPU ID stored in the CPU ID register. Thus, if the device is lost or stolen, it cannot be utilized with another computer to access secure information.

In one embodiment, when the user types in his User ID and hits "Enter", the User ID is sent through the USB I/O port 62 to the plug-in client device 61. The receiving function 63 sends the User ID to the client application 65, which accesses the second-factor lookup table 67 and the CPU ID register 68. The client application verifies that the CPU ID is correct, and then retrieves the second factor from the lookup table. The client application then combines the User ID and the second factor to produce a two-factor password. The two-factor password is passed through the transmitting function 64 and out the USB I/O port 62 to the user's PC. The PC then transmits the two-factor password to the server 15 for authentication. A browser plug-in may be utilized to interface with the plug-in client device when the two-factor password is being sent to a server over the Internet.

In the preferred embodiment, after a predefined time period, or upon the occurrence of a predefined event, the client application 65 activates the switch control signal 69 to open the mechanical switch 66. The predefined event may be the transmission of the two-factor password or the reception of an indication that the password was successfully authenticated by the server. Opening the mechanical switch physically isolates the second-factor lookup table and the CPU ID register from the PC and the Internet. Thus, hackers are prevented from accessing the lookup table and thereby determining future two-factor passwords.

In an alternative embodiment, the CPU ID register 68 is implemented so that the client application 65 may access it without closing the mechanical switch 66. In this embodiment, when the plug-in client device 61 is connected to the PC, the client application verifies the CPU ID of the PC. If the CPU ID matches the CPU ID stored in the CPU ID register, the client application 65 activates the switch control signal 69 to close the mechanical switch 66, thereby providing access to the second-factor lookup table 67.

In yet another embodiment, the client application does not control the mechanical switch at all. Instead, the user physically closes the switch when he desires to perform a secure two-factor password authentication, and opens the switch when the authentication is complete.

In other embodiments, there are variations in the CPU ID verification. In one such embodiment, the verification is not performed, enabling the plug-in client device 61 to be utilized with any PC. In another embodiment, the CPU ID register 68 may store the CPU IDs of several PCs. In this way, the user may program the device to operate with several PCs such as a home PC, a laptop, and an office PC. All other PCs would not be recognized.

The location and function of the mechanical switch 66 may vary in additional ways. For example, the switch may be located between the USB I/O port 62 and the client application 65. When the switch is open, there is no access to the client application via the host PC. Additionally, the switch may be configured to open and close only the data line while maintaining power through the USB connection to the client device.

Figure 7:
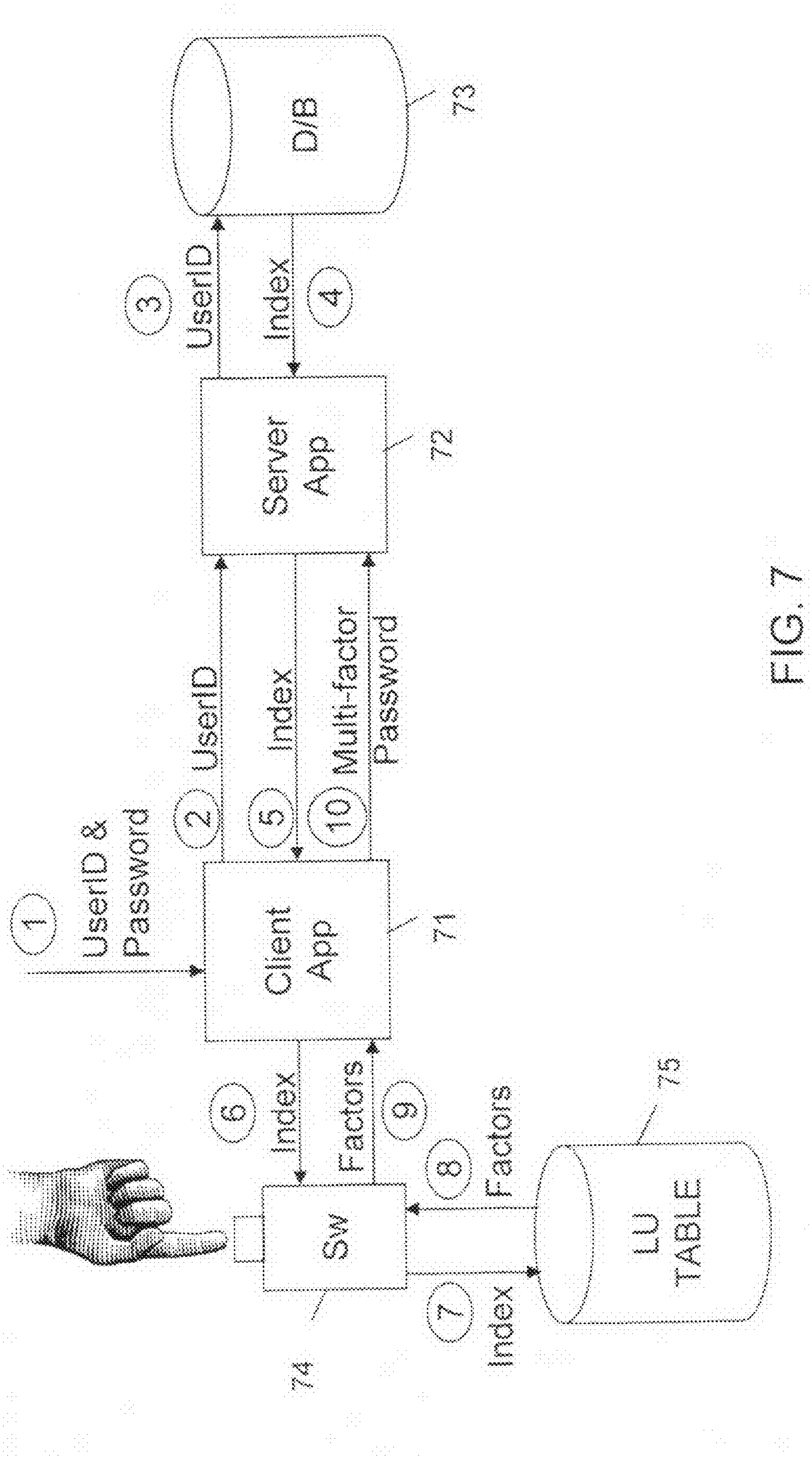
FIG. 7 is a functional block diagram illustrating the flow of information between system components when performing an exemplary secure logon method with a single password-protected server.

FIG. 7 is a functional block diagram illustrating the flow of information between system components when performing an exemplary secure logon method with a single password-protected server. In this embodiment, the system includes a client application 71, a server application 72, a server database 73, a hardware switch 74, and a lookup table 75. The client application may be installed if, for example, on a user's PC or a plug-in device. The server application may be located at the password protected server together with the server database. The mechanical switch physically isolates the lookup table from the user's PC, thereby protecting the lookup table from Trojan programs inadvertently downloaded from the Internet. The hardware switch and lookup table may be implemented in various alternative locations such as in the user's PC, the user's keyboard, or in a USB plug-in device.

The process begins at step 1 where a user enters into the client application 71, a User ID and associated password. At step 2, the client application sends the User ID to the server application 72. The server application recognizes the User ID and uses it at step 3 to access the server database 73. At step 4, the server database sends an index value to the server application. At step 5, the server application sends the index value to the client application. When the user presses the hardware switch 74, the switch allows a single access to the lookup table 75. The client application sends the index value at step 6 to the switch, which uses the index value at step 7 to access the lookup table. At step 8, the lookup table sends one or more password modification factors to the switch, which returns the factors at step 9 to the client application. The password modification factors may include, for example, instructions regarding how to segment the user's password into separate data packets, time intervals for use between each of the data packets, multiple IP addresses for sending each data packet to a different address, extra "filler" bits for placement in the data packets to disguise the character or characters of the password, and the like. The client application then uses the password modification factors to modify the password entered by the user to create a multi-factor password. At step 10, the client application sends the multi-factor password to the server application for authentication.

The process illustrated in FIG. 7 defeats all known Internet threats. The hardware switch 74 defeats Trojan programs by physically isolating the lookup table 75 from the user's PC. The fact that the system creates a multi-factor password, which is different from the password entered by the user, defeats key-logging programs. If the server application 72 returns a different index value each time the user logs on, the client application 71 creates a different multi-factor password each time. This defeats hackers who might intercept the password and attempt to use it later because the password is good for one time only. The system defeats phishing sites because a phishing site cannot know or return a proper index value for creating a legitimate multi-factor password. If a hacker attempts to intercept all communications and perform a man-in-the-middle attack, the server detects errors in the inter-packet timing and rejects the access attempt.

Figure 8:
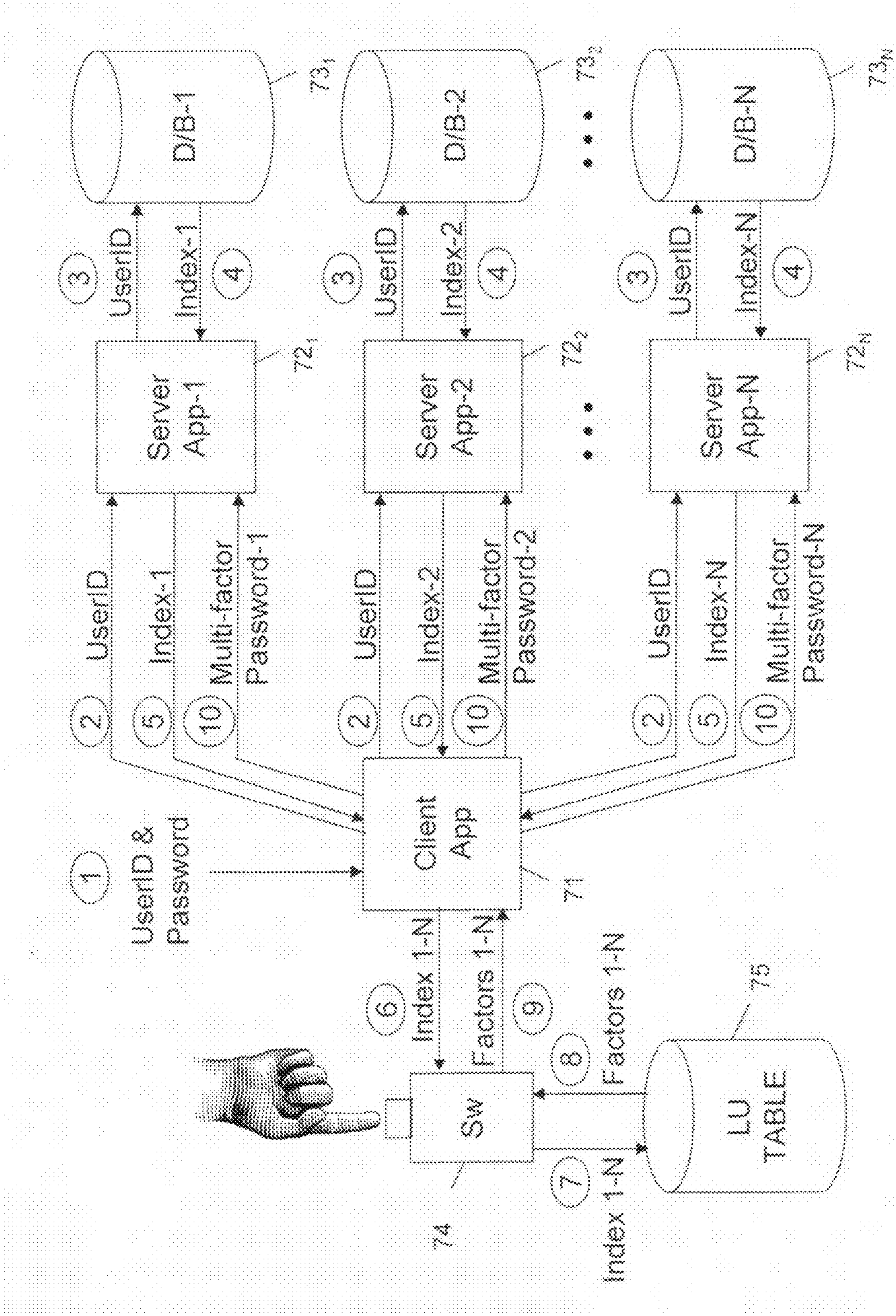
FIG. 8 is a functional block diagram illustrating the flow of information between system components when performing an exemplary secure logon method with multiple password-protected servers.

FIG. 8 is a functional block diagram illustrating the flow of information between system components when performing an exemplary secure logon method with multiple password-protected servers. The process is essentially the same as that described in connection with FIG. 7, except that the client application 71 independently performs the process with each of the password-protected servers. Thus, when the user enters the User ID and associated password into the client application 71, the client application sends the User ID to each of the server applications $\mathbf{72}_1$-$\mathbf{72}_N$. Each server application recognizes the User ID and uses it at step 3 to access an associated server database $\mathbf{73}_1$-$\mathbf{73}_N$ to extract a unique index value for each server. Each server application then sends its own unique index value to the client application.

The client application 71 utilizes each of the unique index values to extract different sets of password modification factors from the lookup table 75. In an alternative embodiment, the client may access separate lookup tables associated with the password-protected servers. The client application then uses the password modification factors to modify the password entered by the user to create multiple multi-factor passwords, one for each server. At step 10, the client application sends the multi-factor passwords to the server applications $\mathbf{72}_1$-$\mathbf{72}_N$ for authentication.

It is important to note that while the present invention has been described in the context of a fully functional computer system, and an exemplary financial authorization network, those skilled in the art will appreciate that the instructions for practicing the method of the present invention are capable of being recorded on any type of a computer readable medium. The steps of the method of the present invention are executed, regardless of the particular type of signal-bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. In an access device, an apparatus for constructing and transmitting a password utilized by an authentication device to authenticate the access device, said apparatus comprising:

means for receiving from a user, a plurality of predefined characters forming a User ID;

a lookup table for storing a plurality of sets of password modification factors, each set including a plurality of predefined modification factors, wherein each set is associated with a predefined index;

a mechanical switch for physically isolating the lookup table from the access device when the switch is in an open position, and for allowing access to the lookup table when the switch is in a closed, position;

communication means for receiving an index value from the authentication device;

means for accessing the lookup table with the index value to retrieve an associated set of password modification factors when the user closes the mechanical switch during an access attempt;

means for generating a password utilizing the retrieved set associated with the index value; and means for transmitting the password to the authentication device.

2. The apparatus according to claim 1, further comprising control means for automatically opening the mechanical switch after retrieval of the associated set of password modification factors to prevent unauthorized accesses to the lookup table.

3. In an access device, a method of constructing and transmitting a password utilized by an authentication device to authenticate the access device, said method comprising:

physically isolating a lookup table from the access device with a mechanical switch in an open position until an access attempt is performed, wherein the lookup table stores a plurality of sets of password modification factors, each set including a plurality of predefined modification factors, wherein each set is associated with a predefined index;

receiving from a user, a plurality of predefined characters forming a User ID;

receiving an index value from the authentication device;

allowing access to the lookup table when the switch is closed by the user;

retrieving from the lookup table, a set of modification factors associated with the index value in the lookup table;

generating a password utilizing the retrieved set of password modification factors associated with the index value received from the authentication device; and transmitting the password to the authentication device.

4. The method according to claim 3, further comprising automatically opening the mechanical switch after the retrieving step to prevent unauthorized accesses to the lookup table.

* * * * *